United States Patent
Boyd, Sr.

(10) Patent No.: US 10,531,765 B2
(45) Date of Patent: Jan. 14, 2020

(54) KAMADO STYLE COOKER

(71) Applicant: Golden's Foundry & Machine Company, Columbus, GA (US)

(72) Inventor: George G Boyd, Sr., Columbus, GA (US)

(73) Assignee: GFMCO LLC, Columbus, GA (US)

( * ) Notice: Subject to any disclaimer, the term of this patent is extended or adjusted under 35 U.S.C. 154(b) by 561 days.

(21) Appl. No.: 14/985,852

(22) Filed: Dec. 31, 2015

(65) Prior Publication Data
US 2018/0368619 A1    Dec. 27, 2018

Related U.S. Application Data

(60) Provisional application No. 62/171,800, filed on Jun. 5, 2015.

(51) Int. Cl.
| | | |
|---|---|---|
| *A47J 37/07* | (2006.01) | |
| *A47J 36/02* | (2006.01) | |
| *A47J 36/12* | (2006.01) | |

(52) U.S. Cl.
CPC ........... *A47J 37/0718* (2013.01); *A47J 36/02* (2013.01); *A47J 37/0704* (2013.01); *A47J 37/0786* (2013.01); *A47J 36/12* (2013.01); *A47J 37/0763* (2013.01)

(58) Field of Classification Search
CPC . A47J 37/0704; A47J 37/0786; F24C 15/023; F24C 15/022
USPC .................... 126/25 R, 9 R, 25 B, 194, 41 R
See application file for complete search history.

(56) References Cited

U.S. PATENT DOCUMENTS

| | | | | |
|---|---|---|---|---|
| 3,683,454 | A | * | 8/1972 | Gronbach ............. E05F 1/1261 16/290 |
| 4,382,312 | A | | 5/1983 | Liggett et al. |
| 4,965,890 | A | | 10/1990 | Fischer |
| 5,318,322 | A | | 6/1994 | Home |
| 5,325,841 | A | | 7/1994 | Hooper et al. |
| D463,196 | S | | 9/2002 | Hsu |
| 6,463,923 | B2 | * | 10/2002 | Carley ................... A47J 36/12 126/25 R |
| 6,499,189 | B2 | * | 12/2002 | Kondo ..................... E05D 3/06 16/239 |

(Continued)

FOREIGN PATENT DOCUMENTS

| | | |
|---|---|---|
| JP | 2014057714 A | 4/2014 |
| WO | 2012077885 | 6/2012 |
| WO | 2013116946 | 8/2013 |

OTHER PUBLICATIONS

U.S. Appl. No. 15/712,699, "Non-Final Office Action", dated Apr. 19, 2019, 11 pages.

(Continued)

*Primary Examiner* — Gregory A Wilson
(74) *Attorney, Agent, or Firm* — Kilpatrick Townsend & Stockton LLP

(57) ABSTRACT

A cast iron kamado style cooker includes a cast iron frustoconical pot and a semi-spherical cast iron lid. Both the lid and the pot are configured with integrally-formed circumferential band surrounding areas of each that comprise the greatest diameter and are pivotally connected to each other so that the lid may be rotated away from the pot. The cooker also includes a lift assist mechanism operative to impart a force to contribute to raising the cast iron lid.

11 Claims, 4 Drawing Sheets

(56) References Cited

U.S. PATENT DOCUMENTS

| | | | |
|---|---|---|---|
| 6,543,435 B1 | 4/2003 | Regen et al. | |
| 6,748,939 B1 | 6/2004 | Gober | |
| 7,770,576 B2* | 8/2010 | Polkinghorn | A47J 37/0786 |
| | | | 126/194 |
| 7,878,186 B2* | 2/2011 | Cusack | A47J 36/12 |
| | | | 126/25 AA |
| 8,925,542 B2* | 1/2015 | White | E05F 1/1261 |
| | | | 126/190 |
| 9,603,484 B2* | 3/2017 | Cleveland | A47J 37/04 |
| 10,070,755 B2* | 9/2018 | Schlosser | A47J 37/0704 |
| 2008/0041359 A1 | 2/2008 | Kim | |
| 2009/0308373 A1* | 12/2009 | Scott | A47J 36/06 |
| | | | 126/25 R |
| 2010/0258105 A1 | 10/2010 | Simms, II | |
| 2010/0258106 A1* | 10/2010 | Simms, II | A47J 37/0704 |
| | | | 126/25 R |
| 2011/0017750 A1 | 1/2011 | Fortkamp | |
| 2011/0079209 A1 | 4/2011 | Bruno et al. | |
| 2011/0283990 A1* | 11/2011 | Walters | A47J 37/0704 |
| | | | 126/25 R |
| 2013/0312732 A1* | 11/2013 | Brennan | A47J 37/07 |
| | | | 126/25 R |
| 2014/0224241 A1 | 8/2014 | McCary | |
| 2018/0078090 A1* | 3/2018 | Boyd, Sr. | A47J 37/0704 |

OTHER PUBLICATIONS

U.S. Appl. No. 15/712,699, "Final Office Action", dated Jul. 30, 2019, 13 pages.

\* cited by examiner

KAMADO STYLE COOKER

CROSS-REFERENCE TO RELATED APPLICATIONS

This non-provisional application claims the benefit of priority under 35 U.S.C. § 120 to U.S. Provisional Application No. 62/171,800 filed Jun. 5, 2015 and which is incorporated by reference as if fully set forth herein.

BRIEF DESCRIPTION OF THE DRAWINGS

The apparatus is described with reference to the accompanying drawings. In the drawings, like reference numbers indicate identical or functionally similar elements.

DETAILED DESCRIPTION

Figure 1:
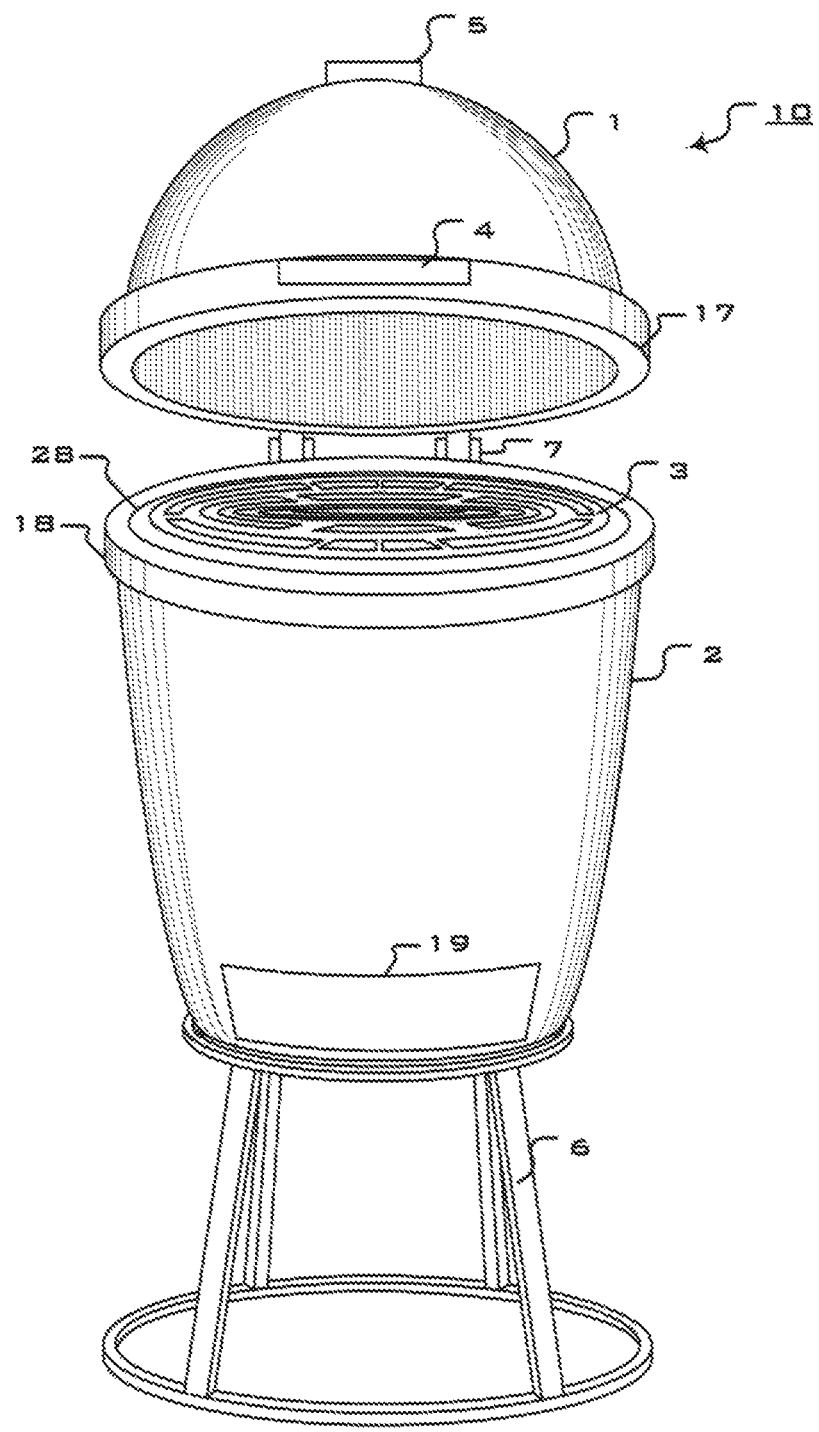
FIG. 1 depicts a first embodiment of an exemplary kamado style cooker.

The various embodiments of the kamado style cooker and their advantages are best -understood, by referring to FIGS. 1 through 4B of the drawings, as well as the accompanying photographs, mechanical drawings, engineering analyses, and other information provided herewith. The elements of the drawings are not necessarily to scale, emphasis instead being placed upon clearly illustrating the novel features and principles of operation. Throughout the drawings, like numerals are used tor like and corresponding parts of the various drawings.

Furthermore, reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "in another embodiment," or variations thereof in various places throughout the specification are not necessarily all referring to its respective embodiment.

A kamado cooker is a traditional Japanese wood or charcoal fueled cook stove. Modem versions of the cooker are believed to derive from clay vessels used by humans to cook food for many thousands of years. However, the use of clay to form the cooker has given way to the use of ceramic materials today. Modern kamado style cookers are made from a variety of materials including high fire ceramics, refractory materials, double wall insulated steel, traditional terra cotta, and a mix of Portland cement and crushed lava rock. Outer surfaces also vary from a high gloss ceramic glaze, paint, a textured stucco-like surface and ceramic tiles. There is a draft opening in the lower side of the unit to provide air to the charcoal, as web as a controllable vent in the top of the dome lid for air to exit the cooker. Temperature is controlled by adjusting these two vents. One or more grates are suspended over the fire to provide the cooking surface(s) for the food.

Manufacturers of the kamado style ceramic cookers claim that they are extremely versatile. Not only can they be used for grilling and smoking, but pizza can be cooked on a pizza stone and bread can also be baked. This is by virtue of the excellent heat retention properties of the ceramic shell that mean temperatures of up to 750° F. (400° C.) can be achieved. Also, due to the precise control of airflow (and thus temperature) afforded by the vent system, Kamado-style cookers are much like wood-fired ovens and can be used to roast and bake anything that can be roasted or baked in a traditional oven.

A common fault in the original Japanese design is that clay and ceramic materials tend to crack over time. Modern ceramic and refractory materials decrease cracking only to some extent, and Portland cement is still associated with cracking problems. Accordingly, a well-known shortcoming of modern Kamado-style cookers is their lack of strength and durability because of the use of ceramic and refractory lining materials.

Figure 2:
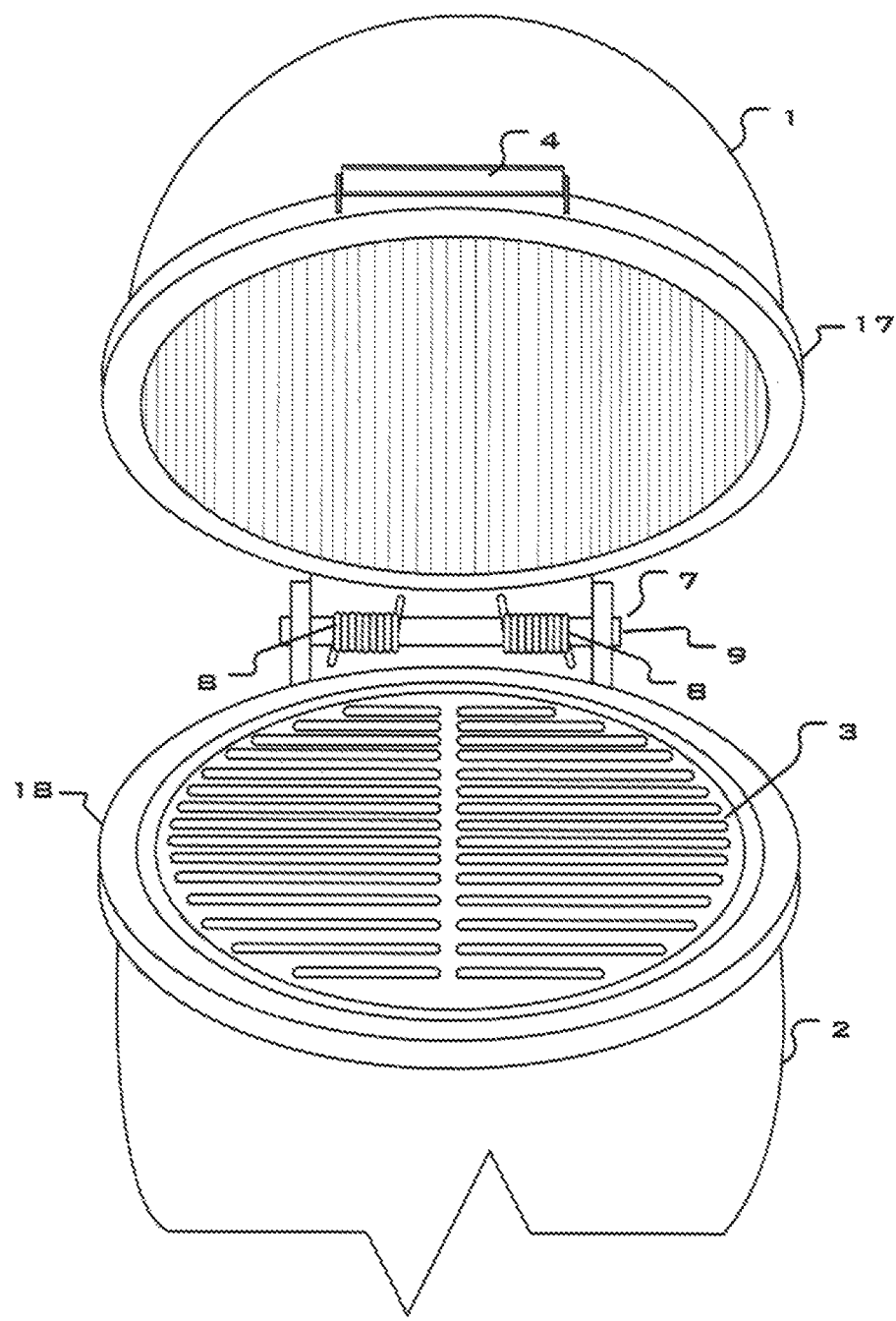
FIG. 2 is a fragmentary view of a kamado style cooker according to one exemplary embodiment with the lid thereof raised.

FIGS. 1 & 2 illustrate an exemplary kamado style cooker 10 comprising a cast iron frustoconical pot 2 in which is defined a top opening 28 in communication with a chamber (FIG. 5, 20) for retaining cooking fuel, e.g., charcoal and a cast iron circular grate 3 that is seated on a lip extending radially inward from the interior surface of the pot proximal to the top opening. The pot 2 is configured with an integrally formed circumferential band 18 around the opening and a vent 19 defined in a portion of the pot wall near the bottom thereof. A semi-spherical domed lid 1 is hingedly attached to the rim of the top of the pot and is operable to cover the top opening to retain heat within the resulting enclosure. The lid 1 comprises an integrally formed hand 17, a handle 4 mounted to the front of the band 17 by which to lift the lid 1, and a dome vent 5 located on the top of the lid 1 generally co-axially with the central axis of the pot 2 when the lid 1 is closed.

Because cast iron is relatively heavy, the hinged connection 7 between the lid 1 and the pot 2 is configured with a lift assist mechanism. In one embodiment, the mechanism comprises one or more helical torsion springs 8 installed on a binge pin 9 and biased to apply torque to rotate the lid 1 away from the pot 2.

Figure 3A:
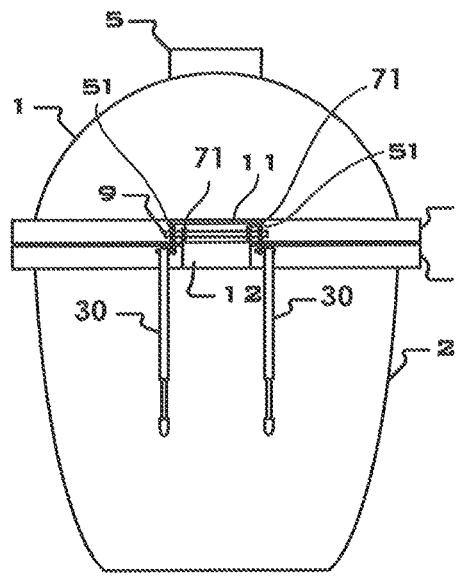
FIG. 3A & 3B are rear and side views of another exemplary embodiment of a kamado style cooker.
Figure 3B:
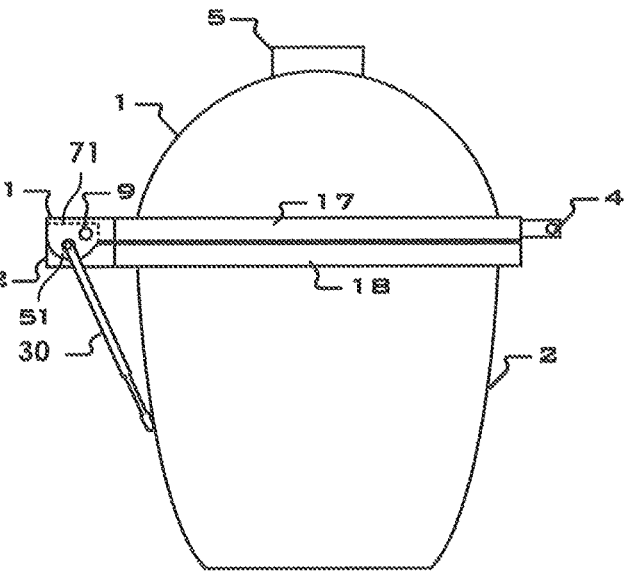

FIGS. 3A & 3B illustrate another embodiment with a lift assist mechanism comprising one or more pneumatic pistons 30. The lid 1 is configured with an upper hinge plate 11 having downward tending flanges 51, the plate 11 extending from band 17 to the rear of the cooker on the opposite side of the lid 1 from the handle 4. The pot 2 also comprises a corresponding lower hinge plate 12 extending from band 18 to the rear and includes upward tending flanges 71. The flanges are configured with a bore that receives a hinge pin 9. In this embodiment, piston 30 is generally vertically oriented having a lower end attached to the outer surface of the rear of the pot 2. The upper end of the piston 30 is pivotally coupled to the downward-tending flanges 51 of the upper hinge plate 11. The piston 30 is operable to apply pneumatic pressure to a piston head at upward end of a piston rod in the upward direction causing the rod to be drawn into the piston cylinder. Thus, when an upward force is applied to the handle 4 to raise the lid 1 a downward force is applied to the upper hinge plate 11 helping to rotate the lid 1 about the hinge pin 9.

Figure 4A:
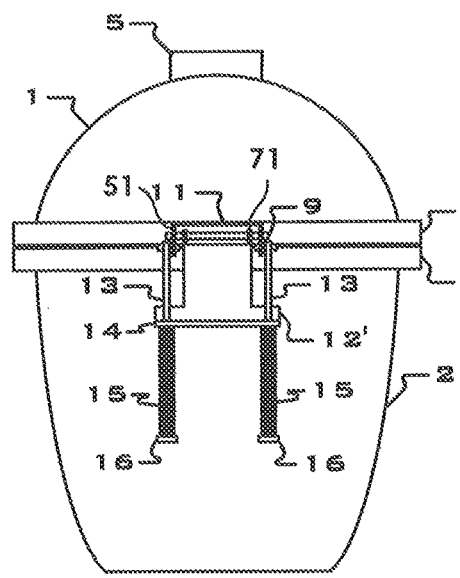
FIG. 4A & 4B are rear and side views of yet another exemplary embodiment of a kamado style cooker.
Figure 4B:
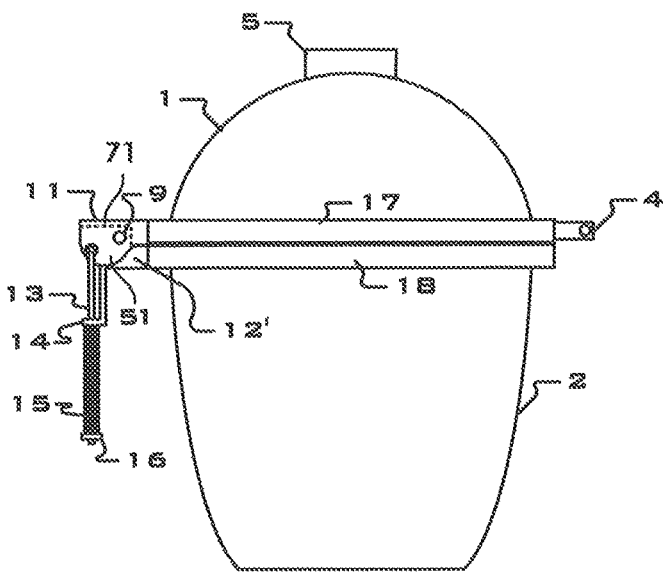

Another version of a lift assist mechanism is shown in FIGS. 4A & 4B where the lower hinge plate 12' is further configured with a horizontal support flange 14. The support flange 14 includes one or more holes defined therein each of which receives a generally vertical tie rod 13. The upper end of the tie rod 13 is pivotally coupled to either downward-tending flange 51 of the upper hinge plate 11 while the lower end of the tie rod 13 terminates in a plate 16. The tie rod 13 extends through a compression spring 15 disposed between the bottom surface of the horizontal support flange 14 and the top surface of the plate 16. When the handle 4 is lifted, force from the compression spring 15 is applied against the horizontal support flange 14 and against the plate 16 pushing them apart and drawing the lower end of the tie rod 13 downward. This in turn applies downward force to the upper hinge plate 11 through the pivotal coupling with the upper end of the tie rod 13 imparting additional rotation to the lid 1 about the hinge pin 9.

Figure 5:
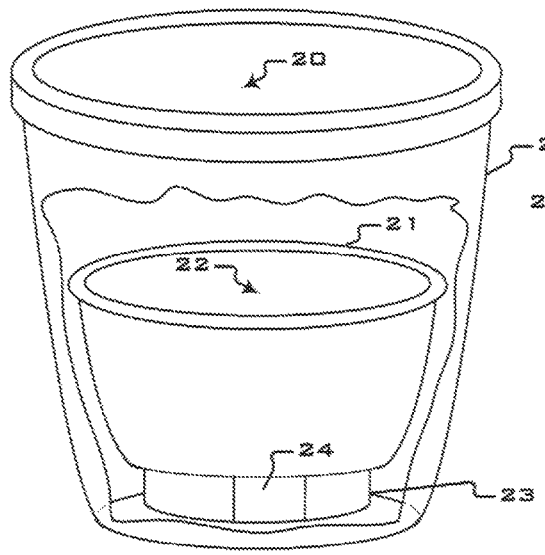
FIG. 5 is a cut-away view of the interior of a kamado style cooker according to another exemplary embodiment.
Figure 6A:
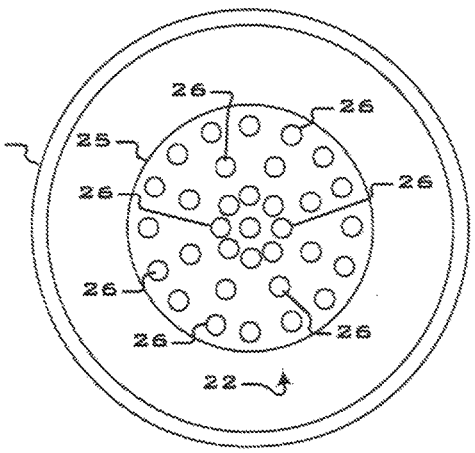
FIG. 6A presents a top plan view of a fire bowl for use with a kamado style cooker.
Figure 6:
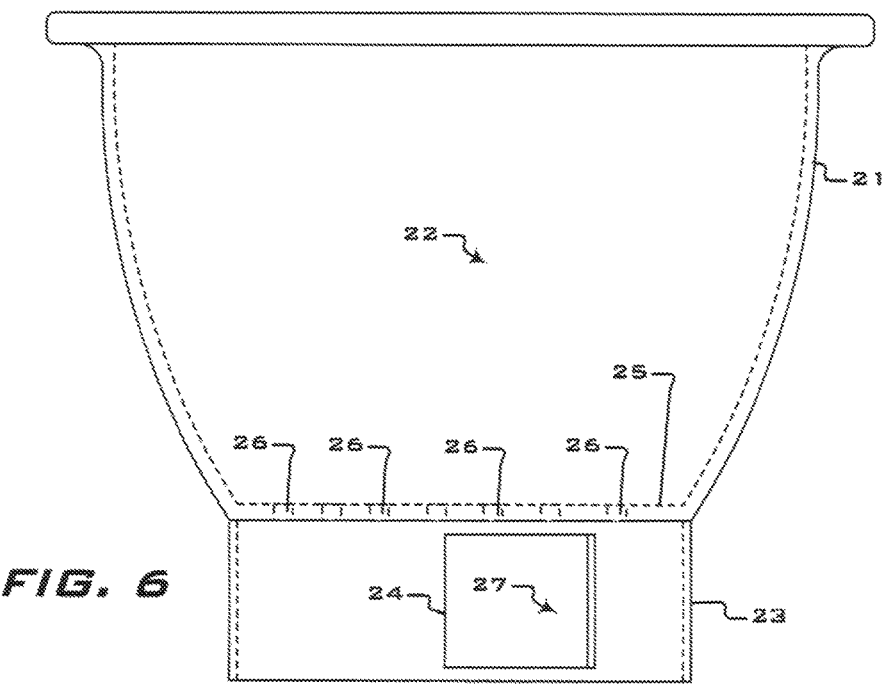
FIG. 6B is an elevation view of the fire bowl of FIG. 6A.

Referring to FIGS. 5, 6 & 6A, in another embodiment of the cooker, a cast iron fire bowl 21 is housed within the chamber 20 defined by the frustoconical pot 2. The fire bowl 21 defines a receptacle 22 for receiving cooking fuel and comprises a floor 25 in which are defined a plurality of openings 26. The fire bowl 21 is configured with a cylindrical pedestal in which is defined a cylindrical chamber 27 with which the plurality of openings 26 in the floor 25 is in communication. The wall of the pedestal includes a vent window 24 open to the cylindrical chamber 27. Thus, the fire bowl 21 contains fire for cooking and air for the fire may be received within the bowl 21 through the openings 26. Air flows into the chamber 20 of the pot 2 via the vent 19 and enters the cylindrical chamber 27 within the pedestal 23 of the fire bowl 21 and then into the receptacle 22 via the openings 26 in die floor 25. In some embodiments the cast iron fire bowl 21 is a unitary article, i.e., a single, cast piece. It will be appreciated that most ceramic cookers use fire boxes, or bowls comprised of two separate ceramic pieces with a cast iron bottom plate. Disadvantages of this structure include unnecessary complexity and reduced durability. A single cast iron fire howl 21 eliminates these shortcomings. Further, a wider range of cooking fuels may be used. Indeed, a cast iron fire bowl permits the use of lighter fluid, which is specifically prohibited in ceramic cookers.

As described above and shown in the associated drawings, the present invention comprises a kamado style cooker formed from cast iron. While particular embodiments have been described, it will be understood, however, that any invention appertaining to die apparatus described is not limited thereto, since modifications may be made by those skilled in the art, particularly in light of the foregoing teachings. It is, therefore, contemplated by the appended claims to cover any such modifications that incorporate those features or those improvements that embody the spirit and scope of the invention.

What is claimed is:

1. A cast iron kamado style cooker comprising:
   a cast iron frustoconical pot comprising:
      a body defining a chamber and a circular opening, wherein the chamber is in fluid communication with the circular opening;
      a lower circumferential band extending along a perimeter of the circular opening, wherein the lower circumferential band is integrally-formed with the body of the pot; and
      a lower hinge plate extending radially outward from the lower circumferential band, wherein the lower hinge plate comprises upward tending flanges, and wherein the upward tending flanges define a bore;
   a semi-spherical cast iron lid dimensioned to cover the circular opening, wherein the lid comprises:
      a body defining a lid chamber and a lid opening, wherein the lid opening is defined in a portion of the body having a greatest diameter of the lid;
      an upper circumferential band extending along a perimeter of the lid opening, wherein the upper circumferential band is integrally-formed with the body of the lid being in hinged connection with the pot; and
      an upper hinge plate extending from the upper circumferential band, wherein the upper hinge plate comprises downward tending flanges, and wherein the downward tending flanges define a bore; and
   a lift assist mechanism operative to impart a force to contribute to raising the lid, wherein the lift assist mechanism comprises:
      a pin extending through the bore of the lower hinge plate and the bore of the upper hinge plate; and
      a helical torsion spring on the pin,
   wherein the pot is pivotally connected to the lid by the lift assist mechanism,
   wherein the downward tending flanges of the upper hinge plate at least partially overlap the upward tending flanges of the lower hinge plate.

2. The cast iron kamado style cooker of claim 1, wherein the helical torsion spring is biased to apply torque to rotate the lid away from the pot.

3. The cast iron kamado style cooker of claim 1, wherein the lift assist mechanism further comprises a pneumatic piston having a first end and a second end, and wherein the first end is pivotally attached to the upper hinge plate of the lid and the second end is pivotally attached to the lower hinge plate of the pot.

4. The cast iron kamado style cooker of claim 1, wherein the lower hinge plate-further comprises a support flange and wherein the lift assist mechanism further comprises:
   a tie rod comprising:
      a lower end comprising a lower plate; and
      an upper end pivotally attached to the upper hinge plate,
      wherein the tie rod extends through a bore defined in the support flange; and
   a compression member supported on the tie rod between the lower plate and the support flange, wherein the compression member comprises an upper end seated against the support flange and a lower end seated against top surface of the lower plate, wherein the compression member is configured to impart a force against the top surface.

5. The cast iron kamado style cooker of claim 1, further comprising a monolithic cast iron fire bowl comprising:
   a sidewall having a top end and a bottom end; and
   a floor between the top end and the bottom end of the sidewall,
   wherein the fire bowl defines a receptacle for cooking fuel between the floor and the top end of the sidewall,
   wherein the floor defines a plurality of openings in communication with the receptacle,
   wherein the fire bowl defines a pedestal chamber between the floor and the bottom end of the sidewall in communication with the plurality of openings, and
   wherein the sidewall defines a vent window between the floor and the bottom end of the sidewall.

6. The cast iron kamado style cooker of claim 5, wherein the helical torsion spring is biased to apply torque to rotate the lid away from the pot.

7. The cast iron kamado style cooker of claim 5, wherein the lift assist mechanism further comprises a pneumatic piston comprising a first end and a second end, and wherein the first end is pivotally attached to the lid and each the second end is pivotally attached to the pot.

8. The cast iron kamado style cooker of claim 5, wherein the lower hinge plate further comprises:
   a support flange extending from the lower hinge plate;
   a tie rod comprising:
      a lower end comprising a lower plate; and
      an upper end pivotally attached to the upper hinge plate,
      wherein the tie rod extends through a bore defined in the support flange; and
   a compression member supported on the tie rod between the lower plate and the support flange, wherein the compression member comprises an upper end seated against a the support flange and a lower end seated against top surface of the lower plate, wherein the compression member is configured to impart a force against both the top surface.

9. The cast iron kamado style cooker of claim 1, wherein, in a closed configuration of the lid relative to the pot, the upper hinge plate is in parallel alignment with the lower hinge plate.

10. A cast iron kamado style cooker comprising:
   a cast iron frustoconical pot in which is defined a chamber in communication with a circular opening, wherein the pot comprises a lower integrally-formed circumferential band;
   a semi-spherical cast iron lid dimensioned to cover the circular opening, wherein the lid comprises an upper integrally formed circumferential band around a portion of the lid having a greatest diameter, and wherein the lid is in hinged connection with the pot;
   an upper hinge plate extending radially outward from the lid;
   a lower hinge plate extending radially outward from the pot, wherein the lower hinge plate is in parallel alignment with the upper hinge plate when the lid is in a closed configuration relative to the pot and pivotally connected to the upper hinge plate, wherein the lower hinge plate comprises a vertical flange terminating in a horizontal support flange, wherein the horizontal support flange defines a bore;
   a lift assist mechanism operative to impart a force to contribute to raising the lid, wherein the lift assist mechanism comprises:
      a tie rod comprising a lower end and an upper end, wherein the lower end comprises a lower end plate, and wherein the upper end is pivotally attached to the upper hinge plate and the tie rod extends through the bore in the horizontal support flange; and
      a compression members supported by the tie rod, wherein the compression member comprises an upper end seated against a bottom surface of the horizontal support flange and a lower end seated against a top surface of the lower end plate, and wherein the compression member is configured to impart force against both the bottom surface and the top surface.

11. The cast iron kamado style cooker of claim 10, further comprising a monolithic cast iron fire bowl comprising:
   a sidewall having a top end and a bottom end; and
   a floor between the top end and the bottom end of the sidewall,
   wherein the fire bowl defines a receptacle for cooking fuel between the floor and the top end of the sidewall,
   wherein the floor defines a plurality of openings in communication with the receptacle,
   wherein the fire bowl defines a pedestal chamber between the floor and the bottom end of the sidewall in communication with the plurality of openings, and
   wherein the sidewall defines a vent window between the floor and the bottom end of the sidewall.

* * * * *